(12) United States Patent
Lamica et al.

(10) Patent No.: US 12,711,450 B2
(45) Date of Patent: Aug. 18, 2026

(54) SYSTEM AND METHOD TO EVALUATE ENTERPRISE DATA ANALYST TRAINING CANDIDATES

(71) Applicant: HARTFORD FIRE INSURANCE COMPANY, Hartford, CT (US)

(72) Inventors: Allison L. Lamica, Feeding Hills, MA (US); Renisa D. Sizer, Oklahoma City, OK (US); Robert M. Frenette, Andover, CT (US); James A Madison, Windsor, CT (US); Donna M DeFelice, Southington, CT (US); David J Turner, Farmington, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 300 days.

(21) Appl. No.: 18/183,567

(22) Filed: Mar. 14, 2023

(65) Prior Publication Data

US 2024/0220906 A1 Jul. 4, 2024

Related U.S. Application Data

(60) Provisional application No. 63/477,475, filed on Dec. 28, 2022.

(51) Int. Cl.
*G06Q 10/0639* (2023.01)
*G06Q 10/0631* (2023.01)

(52) U.S. Cl.
CPC ................ *G06Q 10/06395* (2013.01); *G06Q 10/063112* (2013.01)

(58) Field of Classification Search
CPC .......................................... G06Q 10/00–50/00
USPC ............................................... 705/7.11–7.42
See application file for complete search history.

(56) References Cited

U.S. PATENT DOCUMENTS

| | | | | |
|---|---|---|---|---|
| 6,120,299 | A * | 9/2000 | Trenholm | G09B 7/066 434/350 |
| 6,289,340 | B1 * | 9/2001 | Puram | G06Q 10/063112 707/999.005 |
| 7,120,612 | B2 | 10/2006 | Honda | |
| 10,032,385 | B2 | 7/2018 | DeFreitas et al. | |
| 11,511,156 | B2 | 11/2022 | Shavit | |
| 11,880,806 | B2 * | 1/2024 | Preuss | G10L 15/18 |

(Continued)

*Primary Examiner* — Alan S Miller
(74) *Attorney, Agent, or Firm* — Buckley, Maschoff & Talwalkar LLC

(57) ABSTRACT

A system may include a training candidate data store containing electronic records. Each record may include a training candidate identifier and a set of candidate parameters. A training candidate evaluation tool receives, from a remote evaluation device, an indication of a selected training candidate. The tool may then retrieve information about the selected training candidate and automatically calculate, using at least some of the candidate parameters, an enterprise data analyst training score for the selected training candidate. The tool may then transmit the enterprise data analyst training score to a remote evaluation device and receive an indication of acceptance. The enterprise data analyst training score and set of candidate parameters may then be stored in a result data store, and a training workflow may be automatically assigned to the selected training candidate in accordance with the enterprise data analyst training score and enterprise logic.

16 Claims, 16 Drawing Sheets

(56) References Cited

U.S. PATENT DOCUMENTS

2003/0050816 A1* 3/2003 Givens .............. G06Q 10/06398 705/7.14
2004/0111310 A1* 6/2004 Szlam .................. G06Q 30/018 705/320
2004/0186743 A1* 9/2004 Cordero, Jr. ........ G06Q 10/1053 705/321
2005/0246299 A1* 11/2005 Scarborough .......... G06Q 10/10 706/21
2008/0176197 A1* 7/2008 Hartog ................... G09B 19/00 434/236
2008/0182231 A1* 7/2008 Cohen ...................... G09B 7/00 434/350
2009/0299993 A1* 12/2009 Novack .............. G06Q 30/0601 707/999.005
2010/0233663 A1 9/2010 Pennington et al.
2011/0178940 A1* 7/2011 Kelly ................. G06Q 10/1053 705/321
2013/0218620 A1* 8/2013 Liu ........................ G06Q 10/06 705/7.14
2014/0122355 A1* 5/2014 Hardtke ............. G06Q 10/1053 705/321
2015/0269529 A1* 9/2015 Kyllonen ........... G06Q 10/1053 705/321
2016/0196534 A1* 7/2016 Jarrett ................ G06Q 50/2057 705/321
2016/0225283 A1* 8/2016 Fry ...................... G06Q 10/105
2018/0046987 A1* 2/2018 Goren ................ G06Q 10/1053
2022/0067665 A1* 3/2022 Westerheide ...... G06Q 10/1053
2023/0068203 A1 3/2023 Yin

* cited by examiner

1400

| TRAINING CANDIDATE IDENTIFIER 1402 | CANDIDATE NAME 1404 | EVALUATION SCORE 1406 | ASSIGNED WORKFLOW 1408 | STATUS 1410 |
|---|---|---|---|---|
| TC_101 | JANE WEST | 85 | Data Analyst Training Program Workflow | Enrolled |
| TC_102 | JOHN BROWN | 55 | Regular Workflow | NA |
| TC_103 | SAMANTHA GREENE | 76 | Data Analyst Training Program Workflow | Completed |
| TC_104 | TOM DOE | 81 | Data Analyst Training Program Workflow | In Program |

FIG. 14

SYSTEM AND METHOD TO EVALUATE ENTERPRISE DATA ANALYST TRAINING CANDIDATES

CROSS-REFERENCE TO RELATED APPLICATIONS

The current application claims the benefit of U.S. Provisional Patent Application No. 63/477,475 entitled "SYSTEM AND METHOD TO EVALUATE ENTERPRISE DATA ANALYST TRAINING CANDIDATES" and filed on Dec. 28, 2022. The entire content of that application is incorporated herein.

BACKGROUND

A data analyst may retrieve and gather data, organize it, and/or use it to reach meaningful conclusions via data analysis. As used herein, the phrase "data analysis" may refer to a process of inspecting, cleansing, transforming, and/or modeling data with the goal of discovering useful information, informing conclusions, and supporting decision-making. In the business world, data analysts play an important role in making logical decisions and helping businesses operate more effectively.

An enterprise, such as a business, may have employees or staff who have detailed knowledge about the structure, goals, and operation of the enterprise. In general, it is far easier to teach generic technology and data skills to a person with deep experiential business knowledge than it is to teach deep business knowledge to a generic Information Technology ("IT") person, even if that IT person is exceptionally credentialed and experience in areas outside of the enterprise. Such individuals already or quickly understand the issues to be fixed or training workflows and systems to be improved in the business areas in which they have deep experience. Such individuals are also in lower pay ranges as compared to IT pay ranges (so there may be a personal incentive to move). Teaching enterprise knowledge to skilled IT workers and/or manually identifying enterprise employees who might be appropriate for (and interested in) IT training can be a time consuming and error prone process—especially when a substantial number of employees are involved.

Systems and methods for improvements in processes relating to the evaluation of enterprise data analyst training candidates, including candidate scoring, while avoiding unnecessary burdens on computer processing resource utilization, would be desirable.

SUMMARY OF THE INVENTION

According to some embodiments, systems, methods, apparatus, computer program code and means may provide ways to facilitate evaluation of enterprise data analyst training candidates. For example, a system may include a training candidate data store containing electronic records. Each record may include a training candidate identifier and a set of candidate parameters. A training candidate evaluation tool receives, from a remote evaluation device, an indication of a selected training candidate. The tool may then retrieve information about the selected training candidate and automatically calculate, using at least some of the candidate parameters, an enterprise data analyst training score for the selected training candidate. The tool may then transmit the enterprise data analyst training score to a remote evaluation device and receive an indication of acceptance. The enterprise data analyst training score and set of candidate parameters may then be stored in a result data store, and a training workflow may be automatically assigned to the selected training candidate in accordance with the enterprise data analyst training score and enterprise logic.

Some embodiments provide means for receiving, by a computer processor of a training candidate evaluation tool from a remote evaluation device via a distributed communication network, an indication of a selected training candidate; means for retrieving, from a training candidate data store, information about the selected training candidate, wherein the training candidate data store contains electronic records, each record including a training candidate identifier and a set of candidate parameters; based on the retrieved information, means for automatically calculating, using at least some of the candidate parameters, an enterprise data analyst training score for the selected training candidate; means for transmitting the enterprise data analyst training score to the remote evaluation device; means for receiving, from the remote evaluation device, an indication of acceptance of the enterprise data analyst training score; responsive to the received indication of acceptance, means for storing the enterprise data analyst training score in a result data store; and means for automatically assigning a training workflow to the selected training candidate in accordance with the enterprise data analyst training score and enterprise logic.

A technical effect of some embodiments of the invention is an improved and computerized method of managing and scoring candidates for an enterprise. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 14 is a tabular portion of a training candidate data store according to some embodiments.

DESCRIPTION

Figure 1:
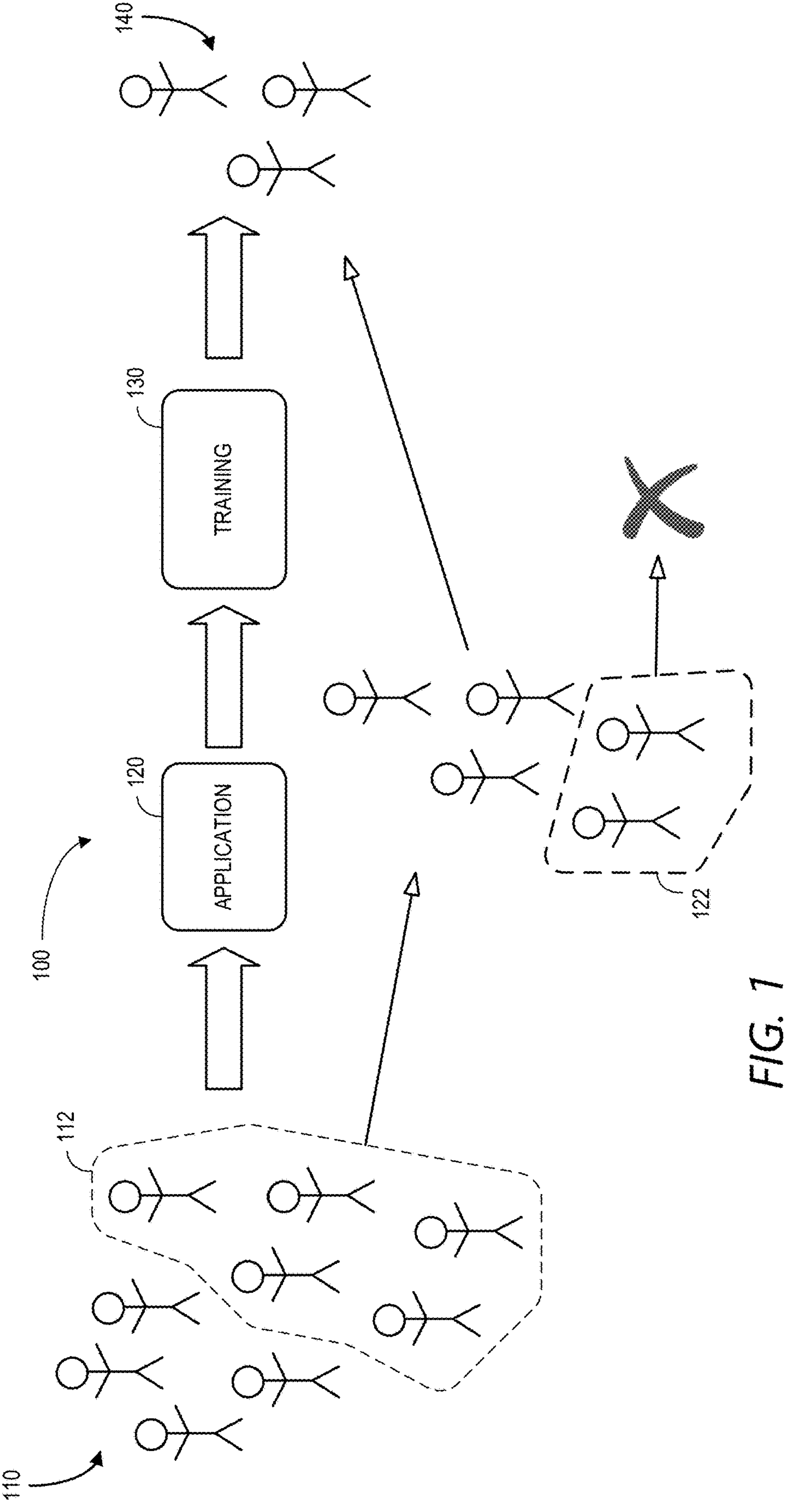
FIG. 1 illustrates an enterprise data analyst training candidate evaluation process according to some embodiments.

Before the various exemplary embodiments are described in further detail, it is to be understood that the present invention is not limited to the particular embodiments described. It is also to be understood that the terminology used herein is for the purpose of describing particular embodiments only and is not intended to limit the scope of the claims of the present invention.

In the drawings, like reference numerals refer to like features of the systems and methods of the present invention. Accordingly, although certain descriptions may refer only to certain figures and reference numerals, it should be understood that such descriptions might be equally applicable to like reference numerals in other figures.

The present invention provides significant technical improvements to facilitate data availability, consistency, and analytics associated with a training candidate. The present invention is directed to more than merely a computer implementation of a routine or conventional activity previously known in the industry as it provides a specific advancement in the area of electronic record availability, consistency, and analysis by providing improvements in the operation of a computer system that uses machine learning and/or predictive models to ensure data quality. The present invention provides improvement beyond a mere generic computer implementation as it involves the novel ordered combination of system elements and processes to provide improvements in the speed at which such data can be made available and consistent results. Some embodiments of the present invention are directed to a system adapted to automatically validate information, analyze electronic records, aggregate data from multiple sources (including text mining), determine appropriate candidate scores and training workflows, etc. Moreover, communication links and messages may be automatically established (e.g., to provide training candidate reports and alerts to appropriate parties within an organization), aggregated, formatted, exchanged, etc. to improve network performance (e.g., by reducing an amount of network messaging bandwidth and/or storage required to support training candidate information collection, analysis, and distribution).

FIG. 1 illustrates an enterprise data analyst training candidate evaluation process 100 according to some embodiments. The process 100 begins with a set of employees 110 of an enterprise (e.g., the staff of a particular department in a business organization). At application process 120 may automatically evaluate the employees 110 to determine a sub-set of the employees 112 who may be especially suited for (and interested in) training to become a data analyst. The sub-set of the employees 112 may have valuable enterprise knowledge and the skills relevant to data analysis (e.g., as reflected by an automatically calculated candidate evaluation score) and therefore be enrolled in a training process 130 to learn the appropriate IT skills. Completion of the training process 130 (during which some 122 of the employees 122 might be removed or resign) may result in a final set 140 of trained, knowledgeable business data analysts 140.

Disclosed herein are processor-executable methods, computing systems, and related technologies and systems that may be used to provide software development and program flow to evaluate enterprise data analyst training candidates. Of particular application to the insurance industry, is the ability to develop software and employees in an efficient manner, even though many insurance companies do not lend themselves to the flexible software development architecture. The software development and program flow associated with data analysts may be classified according to projects that provide types of insurance, levels of insurance protection, and the states and locales where insurance protection may operate and be activated.

Developing computer software, program flows, and employee training is a complicated process, and a myriad of different activities may be included. These include problem definition, requirements development, construction planning, high-level design, detailed design, coding and debugging, unit testing, integration, system testing and maintenance, etc. The main activities of computer software and program flow construction include detailed design, coding, debugging, integration and testing (including unit testing and integration testing). The quality of construction directly affects the quality of the software or program.

Figure 2:
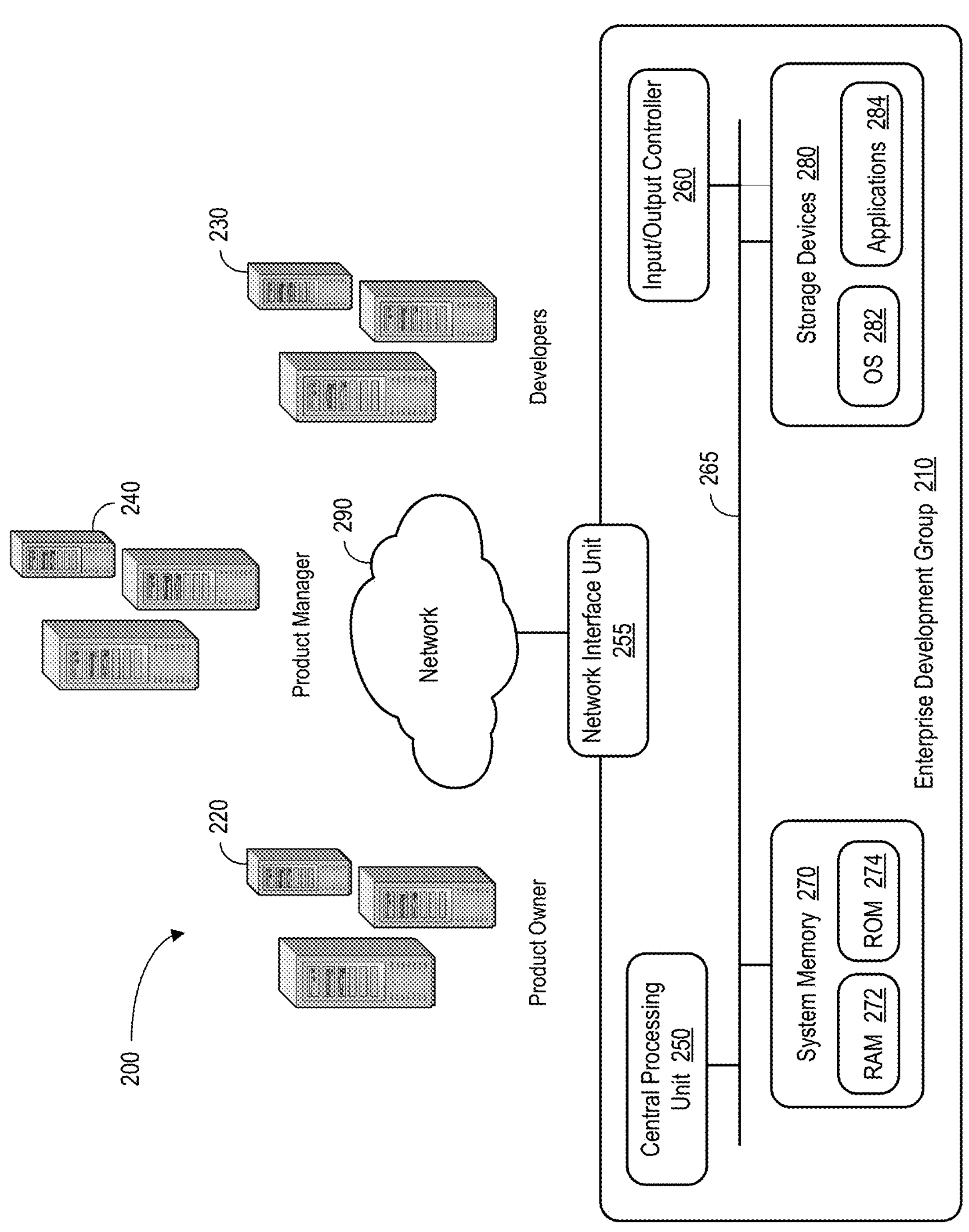
FIG. 2 illustrates a system diagram demonstrating enterprise data analyst training candidate evaluation with a centralized process.

FIG. 2 illustrates a system diagram demonstrating the integration of distributed candidate evaluation with a centralized process. This system has particular application to the insurance industry as insurance companies are often characterized as large, complex, historically constrained environments. As shown in FIG. 2, a product owner 220 interacts with an enterprise development group 210 using a network 290, such as the internet. Product owner 220 may be a customer, for example. Any data provided by or to the product owner 220 passes through the network 290 to the enterprise development group 210. Similarly, developers 230 may provide or receive information via the network 290 to the enterprise development group 210. The project manager 240, which includes the responsibilities of scrummaster under other methodologies, may pass data to the enterprise development group 210 via the network 290. Each product owner 220, developer 230, and project manager 240 may communicate with one another via network 290. The enterprise development group 210 may be configured to communicate with each product owner 220, developer 230, and project manager 240 via network 290. The development system 200 includes a network interface unit 255 to enable the communication with one or more product owner 220, developer 230, or project manager 240.

System 200 includes one or more Central Processing Units ("CPU") 250, network interface units 255, input/output controllers 260, system memories 270, and storage devices 280. Each CPU 250, network interface unit 255, Input/Output ("IO") controller 260, system memory 270, and storage device 280 is communicatively coupled via bus 265.

System memory 270 includes Random Access Memory ("RAM") 272, Read Only Memory ("ROM") 274, and one or more caches (not shown). Storage devices 280 may include one or more applications 284, an operating system 282, and one or more databases (not shown). Storage devices 280 may take the form of, but are not limited to, a diskette, hard drive, CD-ROM, thumb drive, hard file, or a Redundant Array of Independent Disks ("RAID"). System 200 is accessed via network 290 using a mainframe, thin client, personal computer, mobile device, tablet computer, or the like. Information processed by CPU 250 and/or operated upon or stored on storage devices 280 and/or in memory 270 may be displayed to an operator through an evaluation device (not shown).

The software development and program flow may include particular roles, or classes of people, comprising developers 230. For example, certain people may be dedicated to producing the product, or the objective of the project. Product owner 220 may represent the customers, which may be the insurance company, employees of the insurance company, or vendors, for example, and is accountable for ensuring that the developers 230 deliver value to the business. Product owner 220 writes customer-centric items, prioritizes them, and adds them to the product backlog. During software development there may be one product owner 220, and while product owner 220 may also be a developer 230, it may be beneficial that product owner 220 not be combined with the project manager 240.

The developers 230 are responsible for delivering potentially shippable product increments at the end of each development stage, referred to as a sprint. Developers 230 may be made up of several people with cross-functional skills who do the actual work including analyze, design, develop, test, technical communication, document, and the like. Developers 230 are self-organizing, even though developers 230 may interface with project management organizations.

A meeting of the parties involved, sometimes referred to as a scrum, is facilitated by a project manager 240, who is accountable for removing impediments to the ability of the team to deliver the sprint goal/deliverables. Project manager 240 is not in charge of the software development, but may act as a buffer between the developers 230 and any distracting influences. Project manager 240 ensures that the process flows as intended. Project manager 240 is the enforcer of rules. A key part of project manager's 240 role is to protect developers 230 and keep them focused on the tasks at hand. The role has also been referred to as a servant-leader to reinforce these dual perspectives.

Stakeholders (e.g., customers or vendors) (not shown) are the people that enable the project and for whom the project produces the agreed-upon benefits that justify its production. Stakeholders may only be directly involved in the process during sprint reviews. Managers (not shown) are people that control the environment.

Operationally, system 200 monitors and records interactions between and among enterprise development group 210, product owner 220, developers 230, and project manager 240. The specific interactions may be described herein with respect to FIG. 3.

Figure 3:
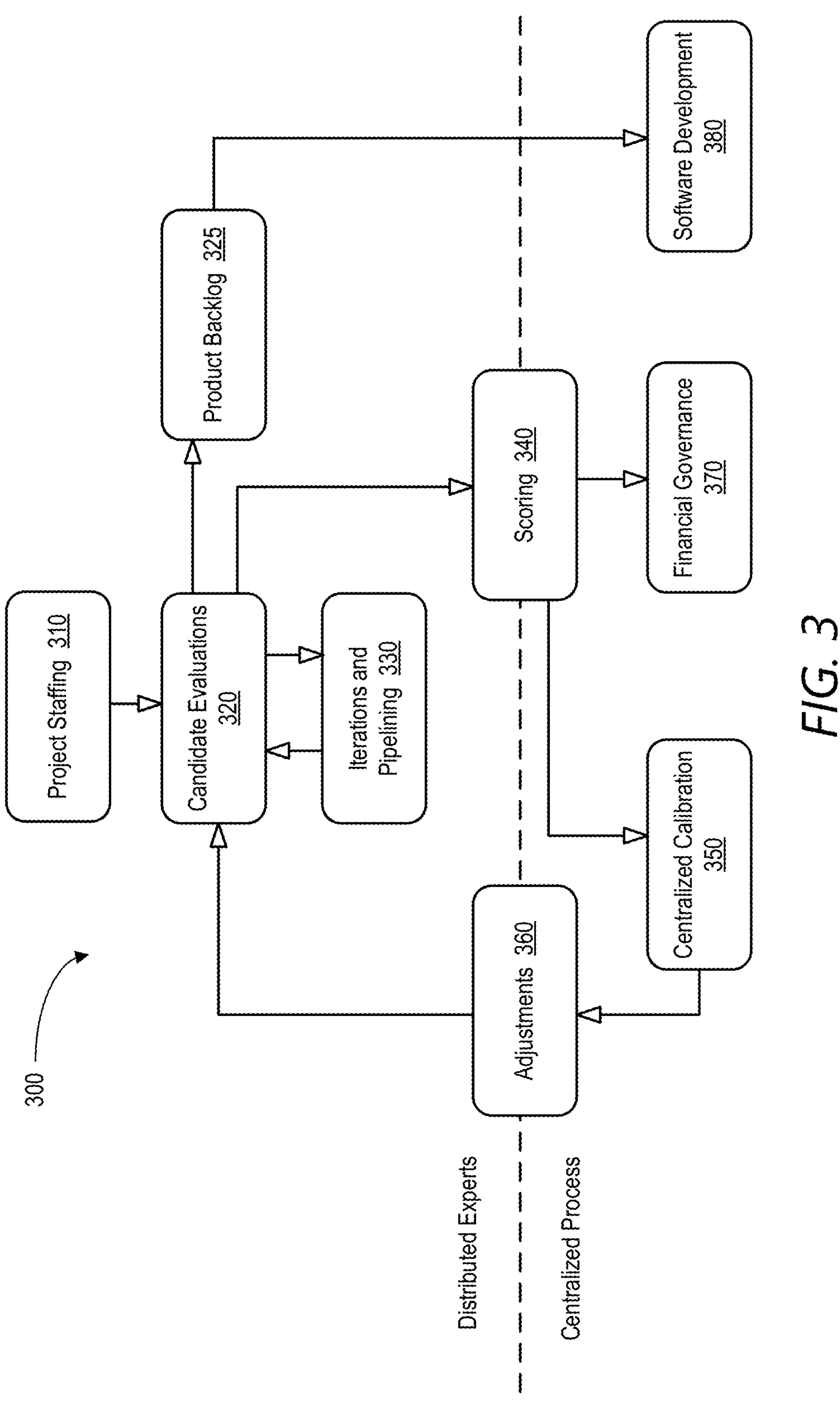
FIG. 3 illustrates a flow demonstrating enterprise data analyst training candidate evaluation with a centralized process.

FIG. 3 illustrates a flow 300 demonstrating the integration of distributed candidate evaluation with a centralized process. Specifically, FIG. 3 illustrates project staffing 310 that is provided as an input to candidate evaluations 320. Iterations and pipelines 330 may be coupled to candidate evaluations 320. Candidate evaluations 320 outputs to scoring 340. After one or more iterations of candidate evaluations 320, scoring 340, centralized calibration 350, and adjusting 360, candidate evaluations 320 output to product backlog 325. Product backlog 325 outputs to software development 380. Scoring 340 outputs to financial governance 370 and centralized calibration 350. Centralized calibration 350 outputs to adjustments 360. Adjustments 360 input back to candidate evaluations 320.

The above processes are performed by distributed experts and/or a centralized process. Distributed experts perform project staffing 310, candidate evaluations 320, iterations and pipelining 330, product backlog 325, and at least a portion of each of adjustments 360 and scoring 340. The other portions of adjustments 360 and scoring 340, and centralized calibration 350, financial governance 370, and software development 380 are part of the centralized process.

Project staffing 310 includes creating developers 230, project manager 240 and product owner 220, and assigning functions and tasks to each created role within the software development. Project staffing 310 includes creation of a team of developers 230. The team is established for the specific tasks to be performed, such as to perform candidate evaluations 320. The team may be limited in size, such a being three to nine members, for example. Multiple independent or interactive teams may act simultaneously, such as the approach known in other methodologies as scrum-of-scrums, for example. Team members are selected for their respective expertise in software development across the centralized process roles, including project management, business analysis, software development, quality assurance, or production operations, for example. Even though the team is formed based on the tasks of the centralized process, the team may be charged with disregarding the central process roles when performing candidate evaluations 320, iterations and pipelining 330, candidate evaluations 320, and adjustments 360. In candidate evaluations 320, the team members may consider any aspects of what is needed to deliver trained, enterprise knowledgeable business data analysts.

A product owner 220 may also be selected in project staffing 310. The product owner 220 is trained on the product owner 220 sub-process. That is, the product owner 220 may be trained on the specifics of the software development and may interact with the enterprise development group 210 to understand and aid in developing the software for the enterprise customer. The product owner 220 may be responsible for interacting with enterprise development group 210 on a continual basis for the duration of the project.

While the scrum process in the software industry generally recognizes the power and responsibility of the product owner 220, flow 300 modifies this standard in order to operate and account for the large, complex, historically constrained environment of the insurance company and industry. Such modifications include accountabilities to larger stakeholder communities, greater financial rigor, integrating the competing business priorities of multiple constituencies, and constraining the current product development work based on the limitations of other systems caused by the complexity of insurance logic and the nature of change-sensitive infrastructure resulting from the diversity of systems evolved from heterogeneous insurance products. During the project, the product owner 220 may continually execute activities and manage decision making responsibilities. These decision-making responsibilities may include setting backlog priorities for the developers 230. Backlog priorities may be set quickly and unambiguously. The product owner 220 may make decisions for the developers 230 based on priorities of the business and organization, and may be willing to accept lower-quality design in exchange for more business functionality. Similarly, based on an understanding of the tasks of the developers 230, the product owner 220 may be responsible for working within the insurance company to bring together individuals and resources with knowledge of the business problem being solved by the software being developed. The product owner 220 may align the priorities of the work being done by the developers 230 to the priorities stated in the organizational Cost Benefit Analysis ("CBA") and project charter for the project and the priorities set through the centralized process.

The function of the product owner 220 may be assigned in project staffing 310. For example, product owner 220 may maintain communication and coordination responsibilities with developers 230 and enterprise development group 210. The product owner 220 directs the development to follow a centralized process. This centralized process enables the realities discovered by the distributed experts that make initial assumptions infeasible to be overcome by modification of the assumptions. Product owner 220 and/or project manager 240 may handle the changes in control process.

Product owner 220 collaborates with the larger community to understand all priority drivers and communicate decisions to the larger community in the centralized process, while balancing the competing forces to determine the final prioritization of product backlog 325. The product owner 220 may be responsible for adjusting the priorities of the product backlog 325 and iterations and pipelining 330 based on the input of the developers 230 based on their understanding of technology constraints. The product owner 220 may work with business leaders to understand the objectives of the larger organization and ensure proper prioritization of the product backlog 325 accordingly. The product owner 220 may manage expectations throughout the community of the centralized process when priorities shift.

Candidate evaluations 320 include reviewing resumes, performance reviews, questionnaire responses (using, for example Optical Character Recognition ("OCR"), Natural Language Processing ("NLP"), and/or Machine Learning ("ML") algorithms) to identify current non-IT employees of an enterprise who may possess valuable knowledge about the enterprise be especially suited for business data analyst training.

The product owner 220 and developers 230 may execute the iterations and pipelining 330. Iterations and pipelining 330 is generally performed in parallel with generating the content in candidate evaluations 320 and creating the product backlog 325 and/or may be performed after the product backlog 325 is substantially completed.

Candidate evaluations 320 may include assigning scores to each candidate associated with the software development. This may include assigning a number to the candidate based on several weighted factors including enterprise knowledge indicators, IT potential, personal interest in the program, etc.

Centralized calibration 350 may be the process of ensuring that candidate evaluations 320 are being done consistently throughout an organization. Centralized calibration is centralized in that the standards and practices followed are published and mandated by a central authority in the organization. Calibration is the process of adjusting information, interpretations, understanding, and opinions of those involved until there is a reasonable confidence that all parties are using the same criteria for judgment. The expertise of the software development teams may be augmented by staff from the centralized calibration 350 practice whose role is specifically to help everyone score consistently.

As shown in FIG. 3, adjustments 360 provided through the loop to candidate evaluations 320 through an operations loop. The flow of operations loop may be repeated with the candidate evaluation 320 operating with adjustments 360. Candidate evaluation 320, including adjustments 360, may operate with scoring 340 run through candidate evaluation 320 by the distributed experts. Discrepancies are in the operations loops are expected and are the reason why the process is iterative.

Any discrepancies in candidate evaluation 320 may be addressed by the distributed experts by accepting the findings of the calibration process 350 and adjusting the story points to the centralized story points, and/or reviewing the rationale of the centralized process experts and exchanging information to enable the distributed experts and the centralized process experts to reach an agreement on a new estimate.

The adjustment 360 may be fed back into the centralized calibration process 350 until the total adjusted difference is zero, or meets a threshold that is agreed upon by all developers 230, such as an absolute value maximum of one for the adjusted difference per user story, for example. The distributed experts may utilize their calibration skill to propagate the same magnitude to all user stories below the top-level user stories using the same process described herein, but repeating to whatever depth of calibration is deemed necessary by the distributed experts or the centralized process.

Financial governance 370 may include the modeling and meeting of financial benchmarks associated with the project. In order to provide financial governance, the estimates may be feed into the centralized process. Software development 380 may be fed from the product backlog 325 and may be completed when the product backlog is sent through the normal centralized process Software Development Life-Cycle ("SDLC").

Figure 4:
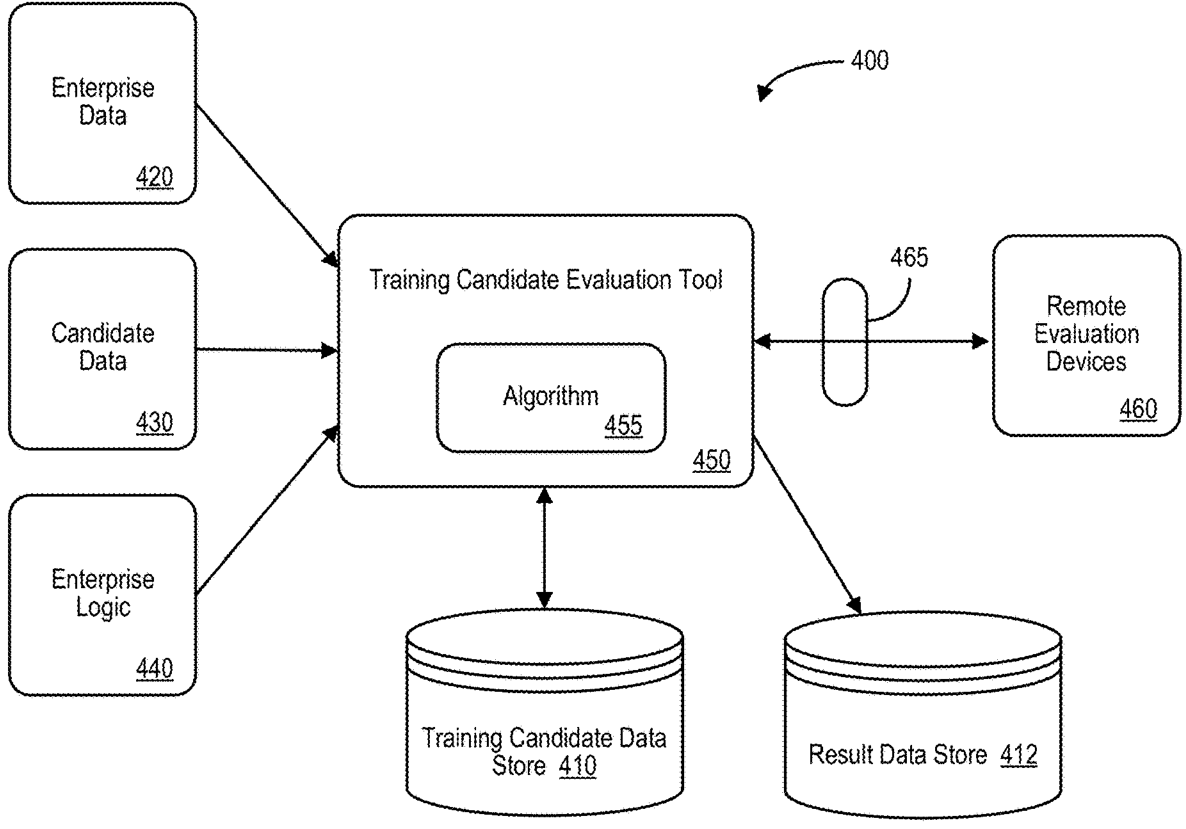
FIG. 4 is block diagram of a system in accordance with to some embodiments of the present invention.

FIG. 4 is a high-level block diagram of a system 400 according to some embodiments of the present invention. In particular, the system 400 includes a training candidate evaluation tool 450 that may access information in a training candidate data store 410 (e.g., storing a set of electronic records representing employees who may be evaluated for business data analyst training), etc.) and/or a result data store 412 (e.g., to store automatically generated decisions). The training candidate evaluation tool 450 may also retrieve information from other data stores or sources (e.g., enterprise data 420 about a business, candidate data 430 such as test results and questionnaire responses, etc., and enterprise logic 440 defining candidates may be scored and evaluated in connection with an algorithm 455 and apply ML or artificial intelligence algorithms and/or models to the electronic records. The training candidate evaluation tool 450 may also exchange information with remote evaluation devices 460 (e.g., via communication port 465 that might include a firewall). According to some embodiments, the algorithm 455 of the training candidate evaluation tool 450 may facilitate the display of information associated with incoming documents via one or more remote computers (e.g., to enable a manual review of automatically generated training candidate scores, establish a communication link with a candidate or manager, and/or initiate an automatically assigned training workflow) and/or the remote evaluation devices 460 (e.g., associated with a person or automated cloud-based service). For example, the remote evaluation devices 460 may receive updated information (e.g., new scores) from the training candidate evaluation tool 450. Based on the updated information, a user or process may review the data from the training candidate data store 410 and make informed decisions about training candidate management. Note that the training candidate evaluation tool 450 and/or any of the other devices and methods described herein might be associated with a cloud-based environment and/or a third-party, such as a vendor that performs a service for an enterprise.

The training candidate evaluation tool 450 and/or the other elements of the system 400 might be, for example, associated with a Personal Computer ("PC"), laptop computer, smartphone, an enterprise server, a server farm, and/or a data store or similar storage devices. According to some embodiments, an "automated" training candidate evaluation tool 450 (and/or other elements of the system 400) may facilitate updates of electronic records in the training candidate data store 410. As used herein, the term "automated" may refer to, for example, actions that can be performed with little (or no) intervention by a human.

As used herein, devices, including those associated with the training candidate evaluation tool 450 and any other device described herein may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The training candidate evaluation tool 450 may store information into and/or retrieve information from the training candidate data store 410. The training candidate data store 410 might, for example, store electronic records representing a plurality of potential candidates, each electronic record having a model identifier and a set of candidate parameters. The training candidate data store 410 may also contain information about prior and current interactions with entities, including those associated with the remote evaluation devices 460. The training candidate data store 410 may be locally stored or reside remote from the training candidate evaluation tool 450. As will be described further below, the training candidate data store 410 may be used by the training candidate evaluation tool 450 in connection with an interactive user interface to provide information about training candidate management. Although a single training candidate evaluation tool 450 is shown in FIG. 4, any number of such devices may be included. Moreover, various devices described herein might be combined according to embodiments of the present invention.

Figure 5:
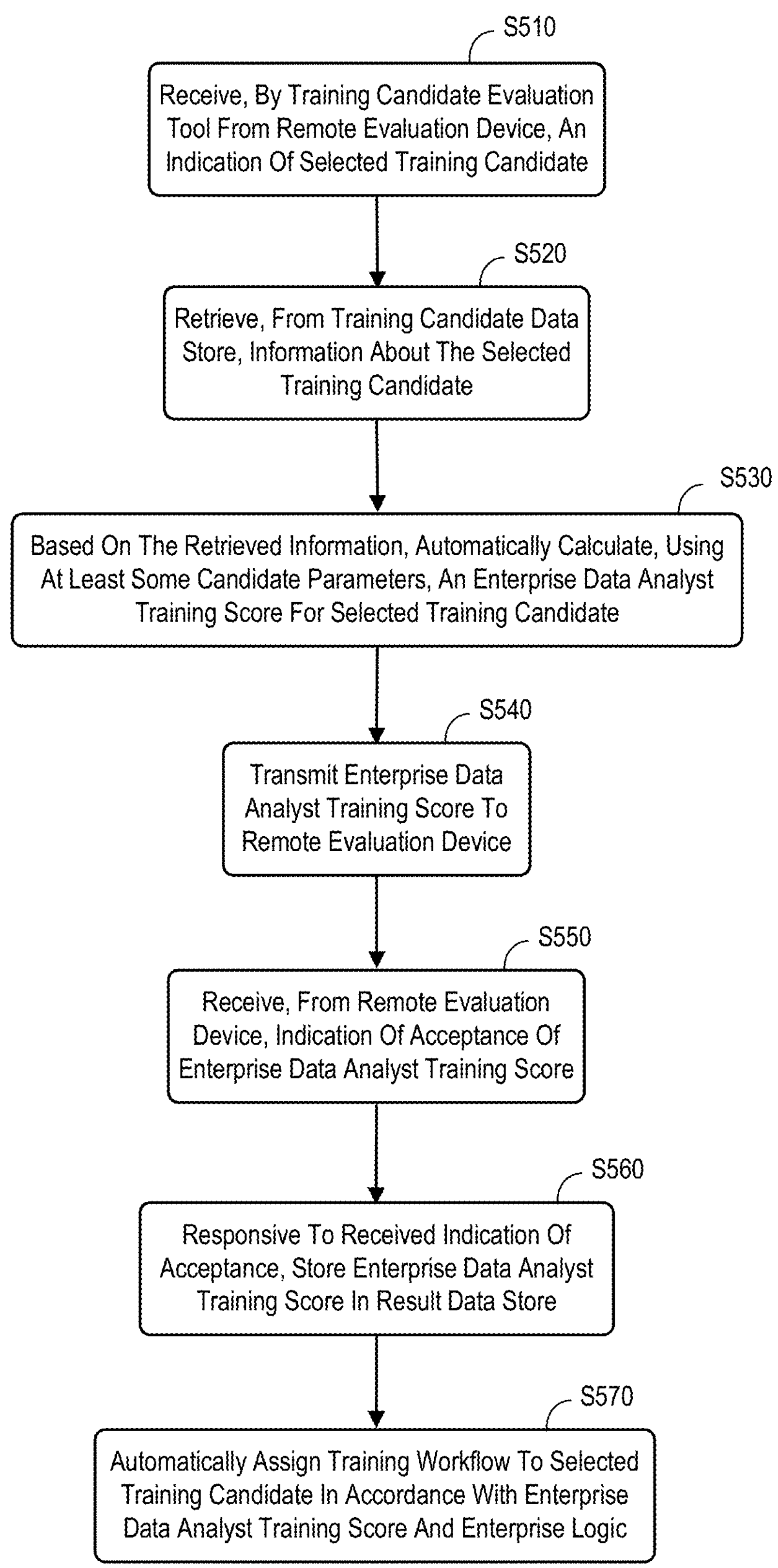
FIG. 5 illustrates a method according to some embodiments of the present invention.

FIG. 5 illustrates a method that might be performed, for example, by some or all of the elements of the system 400 described with respect to FIG. 4 according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S510, a computer processor of a training candidate evaluation tool may receiver, from a remote evaluation device via a distributed communication network, an indication of a selected training candidate. At S520, the system may retrieve, from a training candidate data store, information about the selected training candidate. The training candidate data store may, for example, contain electronic records, each record including a training candidate identifier and a set of candidate parameters. The set of candidate parameters might include, for example, resume data (e.g., illustrating education and work history), performance evaluations (e.g., including manager comments), questionnaire responses (e.g., to gauge interest in performing business data analyst tasks), test scores (e.g., reflecting IT potential), etc.

Based on the retrieved information, at S530 the system may automatically calculate, using at least some of the candidate parameters, an enterprise data analyst training score for the selected training candidate. At S540, the enterprise data analyst training score may be transmitted to the remote evaluation device. At S550, the system may receive, from the remote evaluation device, an indication of acceptance of the enterprise data analyst training score. Note that the indication of acceptance of the enterprise data analyst training score may (or may not) include at least one adjustment to the enterprise data analyst training score.

Responsive to the received indication of acceptance, the system may store the enterprise data analyst training score in a result data store at S560. At S570, the system may automatically assign a training workflow to the selected training candidate in accordance with the enterprise data analyst training score and enterprise logic. For example, qualified candidates may be enrolled in a business data analyst training program.

Figure 6:
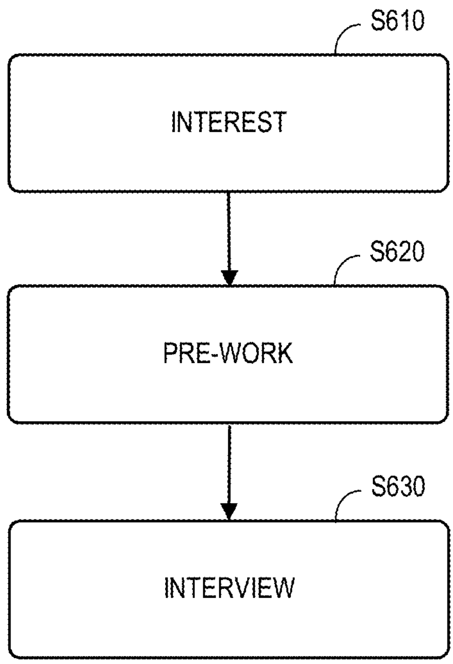
FIG. 6 is a data analyst program application model in accordance with to some embodiments.

FIG. 6 is a data analyst program application model in accordance with to some embodiments. Initially, the interest S610 of a potential candidate may be evaluated. This may include, for example, a data analyst simulation exercise to help understand a candidate's analytical skills and/or simple hands-on exercises to determine ability and help estimate interest in business data analyst task. The application model further includes self-directed (e.g., 30 to 40 hours) pre-work S620. The pre-work S620 may be associated with data analytics literacy, database fundamentals, Business Intelligence ("BI"), etc. Finally, the application model may include an interview S630, such as one or more in-person interviews and/or whiteboard exercises (e.g., a panel behavioral interview with a technical whiteboard) to determine business acumen.

Note that the application model may include marketing to employees (e.g., automatically generated emails to particular employees), a way of determining employee interest, and a mechanism to align operational experience with technology training workflow requirements. The application model may further include a mechanism to screen operational staff for alignment with technology training workflows as well as a mechanism to train staff for efficacy in data training workflows. For example, a mechanism may be provided for evaluating an overall portfolio of need in a landing area to ensure readiness. Such an approach may further provide the benefit of using experiential knowledge to accelerate an issue fix and usability improvement process. According to some embodiments, management is able to nominate individuals based on alignment and the system may adjust a ranking and scoring approach based on background of the individual in question.

Figure 7:
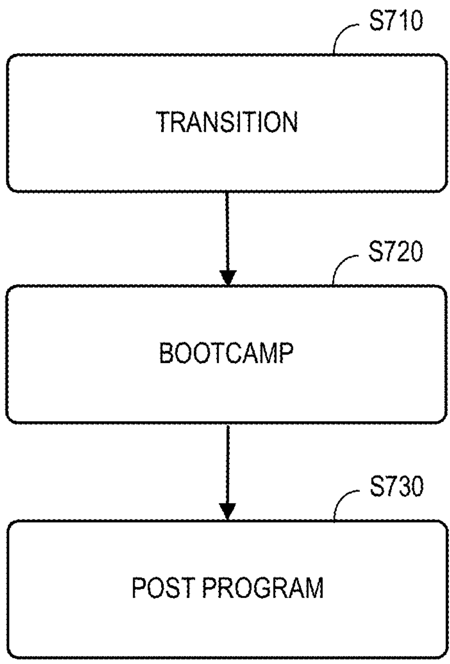
FIG. 7 is a data analyst program model according to some embodiments.

FIG. 7 is a data analyst program model according to some embodiments. The program model may begin with a transition S710 to help selected candidates prepare for bootcamp with mini-projects an introductory (e.g., eight hour) learning curriculum. As described with respect to FIG. 10, the transition S710 might include "find the key," "find the orphans," and "what was in force?" exercises, etc.

Figure 8:
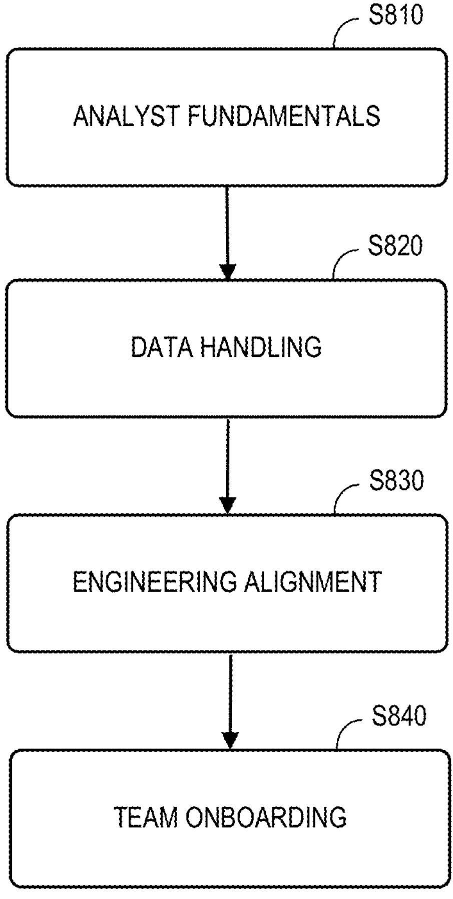
FIG. 8 is a high-level data analyst training curriculum in accordance with to some embodiments.

During bootcamp S720, instructor led learning may teach analyst fundamentals, data handling, engineering alignment, etc. For example, FIG. 8 is a high-level data analyst training curriculum in accordance with to some embodiments. Analyst fundaments S810 may include converting business needs to formal requirements, structure and decomposition of requirements, building test cases, engaging customers and broader stakeholders, getting and communicating sign-off, interacting with developers for testing, etc. Data handling S820 may include rationale and basics for shaping data, how to understand and create keys, querying of data in its native form, wrangling data for basic analysis, major platforms and their highlights, presenting data for analysis during development, presenting data for business consumption, etc. Engineering alignment S830 may include basics of the software development lifecycle, nature of the SDLC roles (including trainee's), programs, projects, and sprints, use of SDLC tools and agile techniques, the layers of a data flow, reading business logic in code, handling business logic at scale, etc.

Finally, team onboarding S840 may include getting into the major database technologies, navigating schemas and file systems, handling of business data analyst artifacts in your local area, metadata, quality, and change management of data, major subject areas of the business, how business subjects are codified in data, etc. Referring again to FIG. 7, post program S730 may provide the team onboarding S840 training (e.g., a one-week program) and continued monitoring for post-program success. That is, a mechanism may be provided for feedback on efficacy to go full circle and improve the program model.

Thus, embodiments may provide a mechanism to increase alignment of technology assets to business needs by funneling business operations staff and their corresponding knowledge toward IT areas that manage the systems and data for the business areas. According to some embodiments, a typical candidate might have between two and five years of experience. They may have worked, for example, in the insurance domain in one of the areas core the insurance business (such as claims handling, call center operations, sales and support, junior underwriting, junior actuarial, etc.) that provide direct knowledge of business operations, insurance products, and computer systems. This knowledge then is used as some of the most critical knowledge when they are assigned to their IT job that supports the IT systems and data for the area they were in, or an adjacent area in the business operations. The assigned final area does not have to be exactly where the candidate started (because skills transfer) but assessing the best fit while also allowing for mobility may be an important part of the process. Embodiments may also seek people who do the "small scale" technology or data work that is sometimes performed by staff. For example, EXCEL® spreadsheets can get very advanced, and it's not uncommon for business units to have very robust ones. The staff who tend to gravitate toward making such advanced "end user computing" environments may be automatically identified.

Embodiments may also align operational experience with technology and data delivery. A set of business areas and types of knowledge needed in a target area may be defined and then used to find business areas appropriately aligned (and staff even more directly aligned. Embodiments may also provide for an evaluation of a portfolio of need in targeted technology area. That is, the evaluation may avoid selecting people unless there are slots in the targeted area. For example, the system may proactively reach out to leaders to get input about the slots they need to fill. This may include reports about all of the slots with those skills and the annual turnover rate. Such an approach may also integrate with the budgetary process to ensure that costs can be covered in the target area.

Embodiments may also provide a mechanism for managers to nominate individuals for the process. Part of the selection process may be general marketing and publicity, but there may also be a mechanism for outreach to managers to let them nominate individuals and promote them in the process (so that they have an increased likelihood of selection). Some embodiments use hands-on exercises as a means of evaluation and screening. The selected candidates may run through hand-on exercises that validate their business knowledge and show that they have the needed competence in technology. This may include insurance industry specific knowledge. Some embodiments may train staff in the basics of technology and data using a generic vendor.

In some embodiments, compensation may be automatically adjusted based on experience versus opportunity. Those coming into IT are often in lower-paying job families, but their experience might put them higher in an IT pay range as compared to what their new, limited experience supports. An algorithm/approach may be provided to adjust for that. With respect to the onboarding process in a target area, the technical training that is given may be generic since their proprietary business knowledge is the main value proposition. That may require that once they land in their target area, further training is provided. Such training may comprise, for example, the combination of both (1) their deep business background and (2) their new-found generic technical knowledge.

Some embodiments may provide for feedback from target area to improve the screening process. All employees may be evaluated in general, but there may be a specific mechanism to evaluate the value of what they were selected on and what they learned from this process that can be used to continually improve selection and training.

Figure 9:
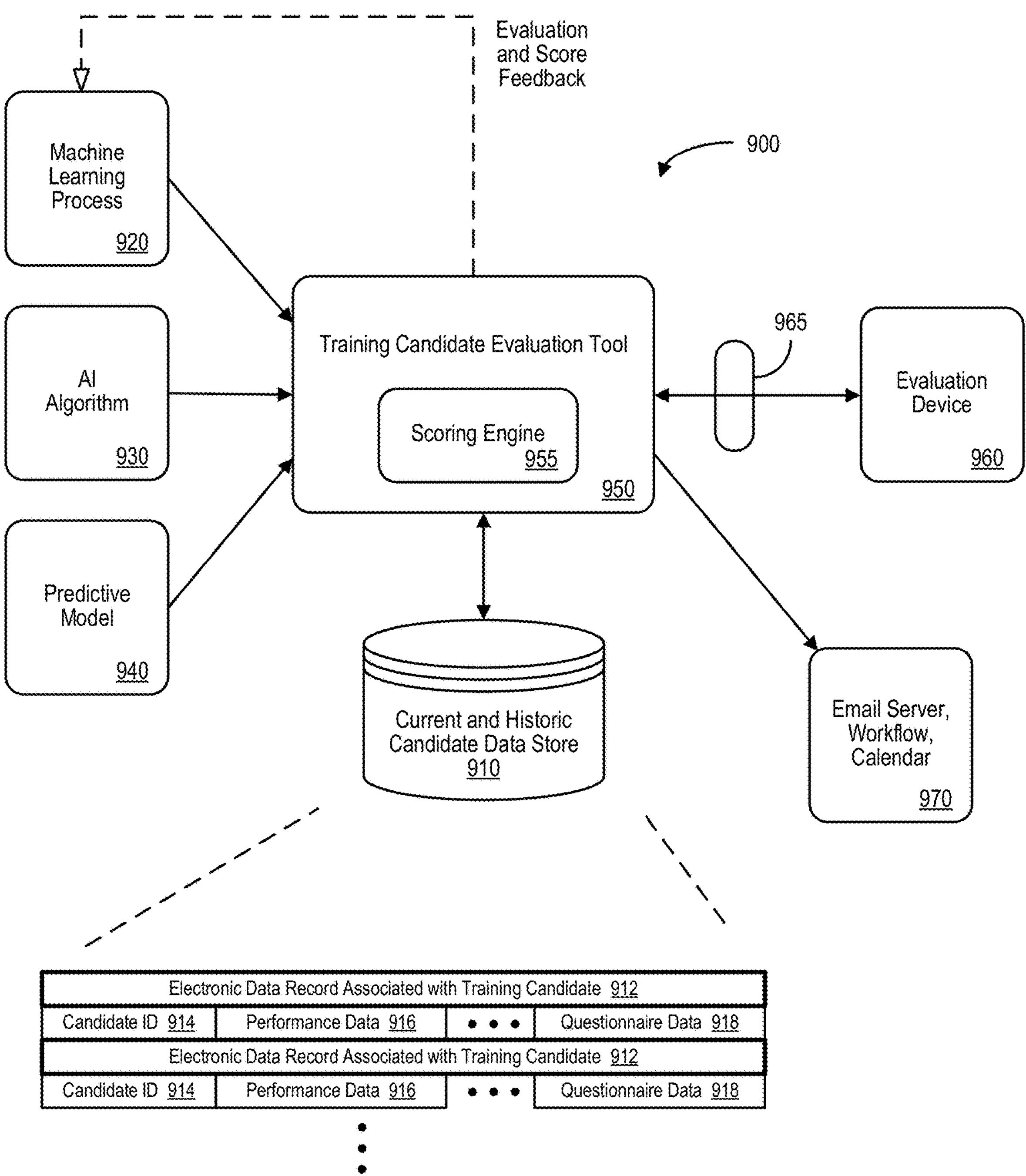
FIG. 9 is a more detailed system according to some embodiments.

FIG. 9 is a more detailed high-level block diagram of a system 900 according to some embodiments. As before, the system 900 includes a training candidate evaluation tool 950 that may access information in a current and historic candidate data store 910. The training candidate evaluation tool 950 may also retrieve information from a ML process 920, an Artificial Intelligence ("AI") algorithm 930, and/or predictive models 940 in connection with a scoring engine 955. The training candidate evaluation tool 950 may also exchange information with evaluation device 960 (e.g., via communication port 965 that might include a firewall) to enable a review of automatically generated scores (e.g., via a ML model, an automated data analysis algorithm, a symbolic rules model, etc.). According to some embodiments, evaluation feedback is provided to the ML process 920 (e.g., so that the scoring engine 955 can be automatically improved). The training candidate evaluation tool 950 might also transmit information directly to an email server (or postal mail server), a workflow application, and/or a calendar application 970 to facilitate candidate evaluation and management.

The training candidate evaluation tool 950 may store information into and/or retrieve information from the current and historic candidate data store 910. The current and historic candidate data store 910 might, for example, store electronic records 912 representing a plurality of training candidates, each electronic record having a set of attribute values including candidate identifier 914, performance data 916, questionnaire data 918, etc. According to some embodiments, the system 900 may also provide a dashboard view of candidate evaluation and management information.

Embodiments may automatically use demonstrated behaviors to help identify appropriate candidates for business data analyst training. For example, in the insurance industry the best candidates might come from call centers, claims adjusting, or similar front-line areas (because a few years in such areas teach that the ground reality is valuable). The system may look for candidates who show a grasp of and interest in the business. In those front-line roles, a good portion of success may be getting the business and showing an interest in it (e.g., just being friendly with customers and quick with your work can make you successful to some degree in such roles, and are always valuable skills). Beyond that, did the candidate show that they learned the business (which was motivating to them). Not just reading product literature back to the customer, for example, but perhaps making recommendations about how their insurance coverages might solve problems.

The system may also evaluate if a candidate is more organized then the average person in that role. Data work is associated with a lot of minutia. Although a reference code, or any one piece of derivation logic, etc. may not be hard to track, but in a large enterprise that may be many thousands of them which can be very difficult to manage. A person good at data content needs to stay organized. As a result, the system may evaluate if a person in their current role tends to exhibit this tendency more than their peers. Similarly, it may be informative if a candidate has previously gravitated toward some type of actual data work in their current role. In most departments, something needs to have data used for reports, spreadsheets, etc. The system may look for people who have taken on (often voluntarily) minor side tasks of handling the data.

Figure 10:
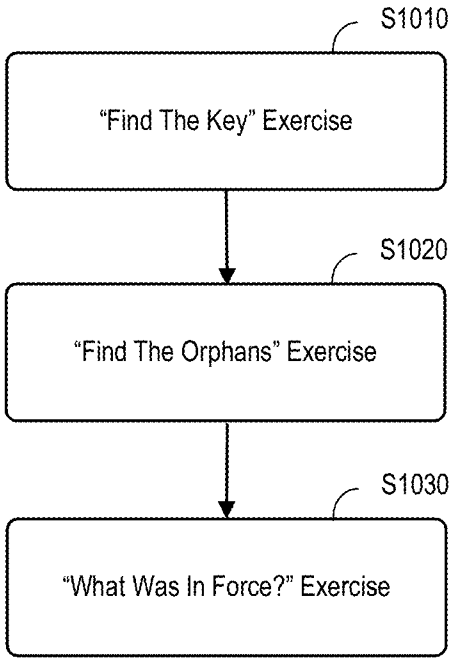
FIG. 10 is a filtering process in accordance with to some embodiments.

FIG. 10 is a candidate filtering process 1000 in accordance with to some embodiments. The process 1000 might be implemented, for example, as a web-based challenge. A "find the key" exercise S1010 may provide the candidate with a small set of data. This exercise S1010 may describe its basic context so that the candidate can think about how they would uniquely identify it. The exercise S1010 may then have the candidate select the key(s) they would use and explain why. This is a basic pattern matching exercise, but it is a life-long skill in the database and sufficiently fundamental that to be used as a relatively simple screen. A "find the orphans" exercise S1020 may provide the candidate with two tables, including a child table that references a parent table. This exercise S1020 may have several rows in the child that lack a key in the parent. These are "orphans" and the exercise S1020 may ask the candidate to identify the orphans and how they would resolve the issue. A "what was in force?" exercise S1030 may be helpful because managing history is a key part of data work, including knowing what was true when across time. The exercise S1030 may put some basic date logic in one or more tables and ask the candidate to determine what codes would apply at what point in time.

Figure 11:
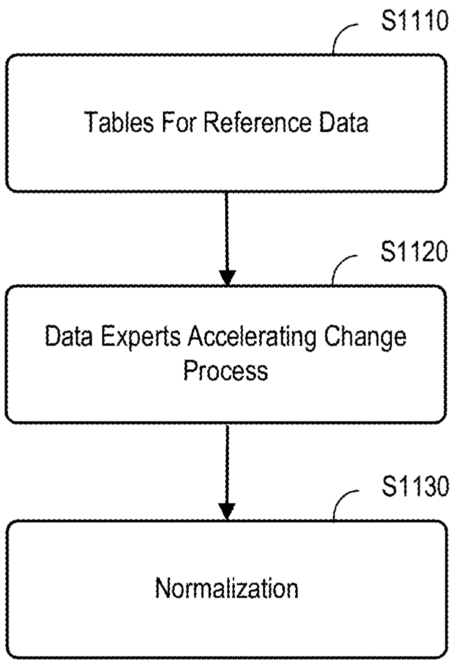
FIG. 11 is an assessment process according to some embodiments.

FIG. 11 is an assessment process 1100 according to some embodiments. The process 1100 may provide information about tables for reference data S1110. Reference data, while conceptually somewhat simple, may also be critical to an enterprise with respect to how it buckets money that goes all the way to things like the annual statement and insurance office filings. The candidates may be taught how these tables work and assess their learning. This may also be the foundation to several other activities.

A Data Experts Accelerating Change ("DEAC") process S1120 may be associated with an enterprise data change communication process. Many tough data problems may flow through it, and experts may solve the problems collectively. The process S1120 may take actual DEAC requests, remove the "answers," and ask the candidates to solve them using the tables that were previously taught S1110. Normalization S1130 may teach some basic normalization theory—although data normalization may be considered a data engineering skill, the basics (in simple terms) are something that a person doing needs to know.

Figure 12:
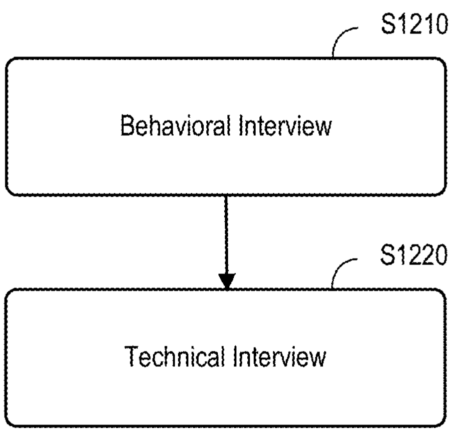
FIG. 12 is an interview process in accordance with to some embodiments.

FIG. 12 is an interview process 1200 in accordance with to some embodiments. A behavioral interview S1210 may check for stubborn attention to detail. A single data element or its logic is generally not hard to track, but when thousands of such elements are involved, good organizational skills are need. People in this area who are successful also have very sharp attention to detail. The behavioral interview S1210 may probe for that tendency to really focus and drill into something. A technical interview S1220 may ask candidates to explain what keys are, how they work, and why they are important. Similarly, candidates may be asked to explain the mechanisms they learned to convert DEAC needs to data encoding.

Figure 13:
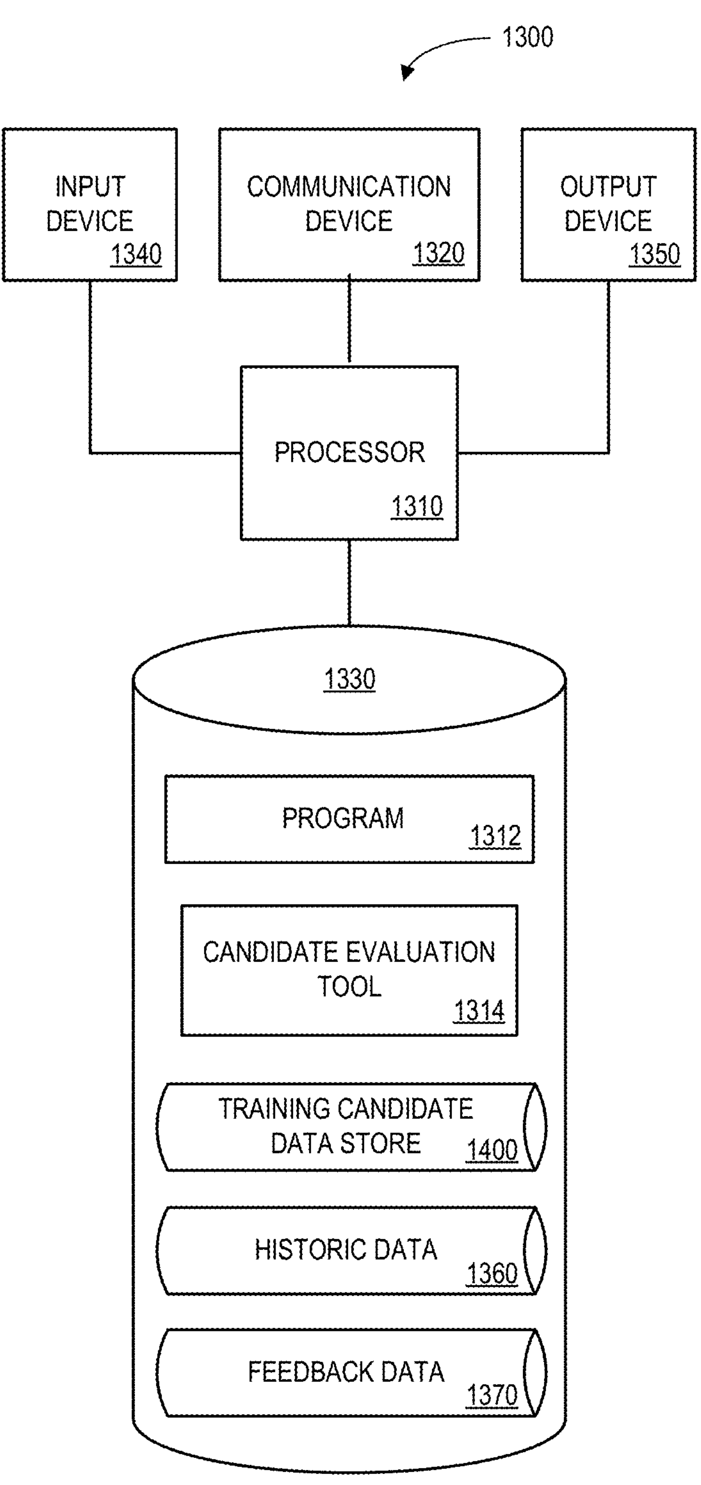
FIG. 13 is a block diagram of an apparatus or platform in accordance with some embodiments of the present invention.

The embodiments described herein may be implemented using any number of different hardware configurations. For example, FIG. 13 illustrates an apparatus or platform 1300 that may be, for example, associated with the systems 400, 900 of FIGS. 4 and 9, respectively (or any other system described herein). The platform 1300 comprises a processor 1310, such as one or more commercially available Central Processing Units ("CPUs") in the form of one-chip or multi-chip microprocessors, coupled to a communication device 1320 configured to communicate via a communication network (not shown in FIG. 13). The communication device 1320 may be used to communicate, for example, with one or more remote devices. The platform 1300 further includes an input device 1340 (e.g., a mouse and/or keyboard to enter candidate information or enterprise logic) and an output device 1350 (e.g., a computer monitor to display automatically generated candidate scores, rankings, alerts, etc.).

The processor 1310 also communicates with a storage device 1330. The storage device 1330 may comprise any appropriate information storage device, including combinations of magnetic storage devices (e.g., a hard disk drive), optical storage devices, mobile telephones, and/or semiconductor memory devices. The storage device 1330 stores a program 1312 and/or a candidate evaluation tool 1314 for controlling the processor 1310. The processor 1310 performs instructions of the programs 1312, 1314, and thereby operates in accordance with any of the embodiments described herein. For example, the processor 1310 may receive an indication of a selected training candidate. The processor 1310 may then retrieve information about the selected training candidate and automatically calculate, using at least some of candidate parameters, an enterprise data analyst training score. The processor 1310 may then transmit the enterprise data analyst training score to a remote evaluation device and receive an indication of acceptance. The enterprise data analyst training score and set of candidate parameters may then be stored in a result data store, and a training workflow may be automatically assigned to the selected training candidate in accordance with the enterprise data analyst training score and enterprise logic.

The programs 1312, 1314 may be stored in a compressed, uncompiled and/or encrypted format. The programs 1312, 1314 may furthermore include other program elements, such as an operating system, a data store management system, and/or device drivers used by the processor 1310 to interface with peripheral devices.

As used herein, information may be "received" by or "transmitted" to, for example: (i) the platform 1300 from another device; or (ii) a software application or module within the platform 1300 from another software application, module, or any other source.

In some embodiments (such as shown in FIG. 13), the storage device 1330 stores historic data 1360 (e.g., to evaluate previous scores and/or training workflow assignments over time to train an AI algorithm), feedback 1370 (e.g., how well various trainees actually performed), and a training candidate data store 1400. An example of a data store that may be used in connection with the platform 1300 will now be described in detail with respect to FIG. 14. Note that the data store described herein is only one example, and additional and/or different information may be stored therein. Moreover, various data stores might be split or combined in accordance with any of the embodiments described herein.

Referring to FIG. 14, a table is shown that represents the training candidate data store 1400 that may be stored at the platform 1300 according to some embodiments. The table may include, for example, entries identifying employees who are being considered for a business data analyst training program. The table may also define fields 1402, 1404, 1406, 1408, 1410 for each of the entries. The fields 1402, 1404, 1406, 1408, 1410, may, according to some embodiments, specify: a training candidate identifier 1402, training candidate name 1404, an evaluation score 1406, an assigned workflow 1408, and a status 1410. The information in the training candidate data store 1400 may be created and updated, for example, when new candidates are evaluated.

The training candidate identifier 1402 and candidate name 1404 may be, for example, unique alphanumeric codes identifying a candidate for business data analyst training. The evaluation score 1406 may be used to rank candidates and/or determine admission to the training program. The evaluation score 1406 might be based on, for example, a candidate's business knowledge (and the importance of that knowledge to an enterprise), the candidate's predicted aptitude for IT work, ML enterprise logic, etc. The assigned workflow 1408 might represent a data analyst training program workflow or a regular workflow (for those not selected to participate). The status 1410 might indicate that a candidate is enrolled in the program, has completed the program, is currently taking the program, etc.

Thus, some embodiments may provide improved training candidate monitoring, evaluation, and scoring. The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 15:
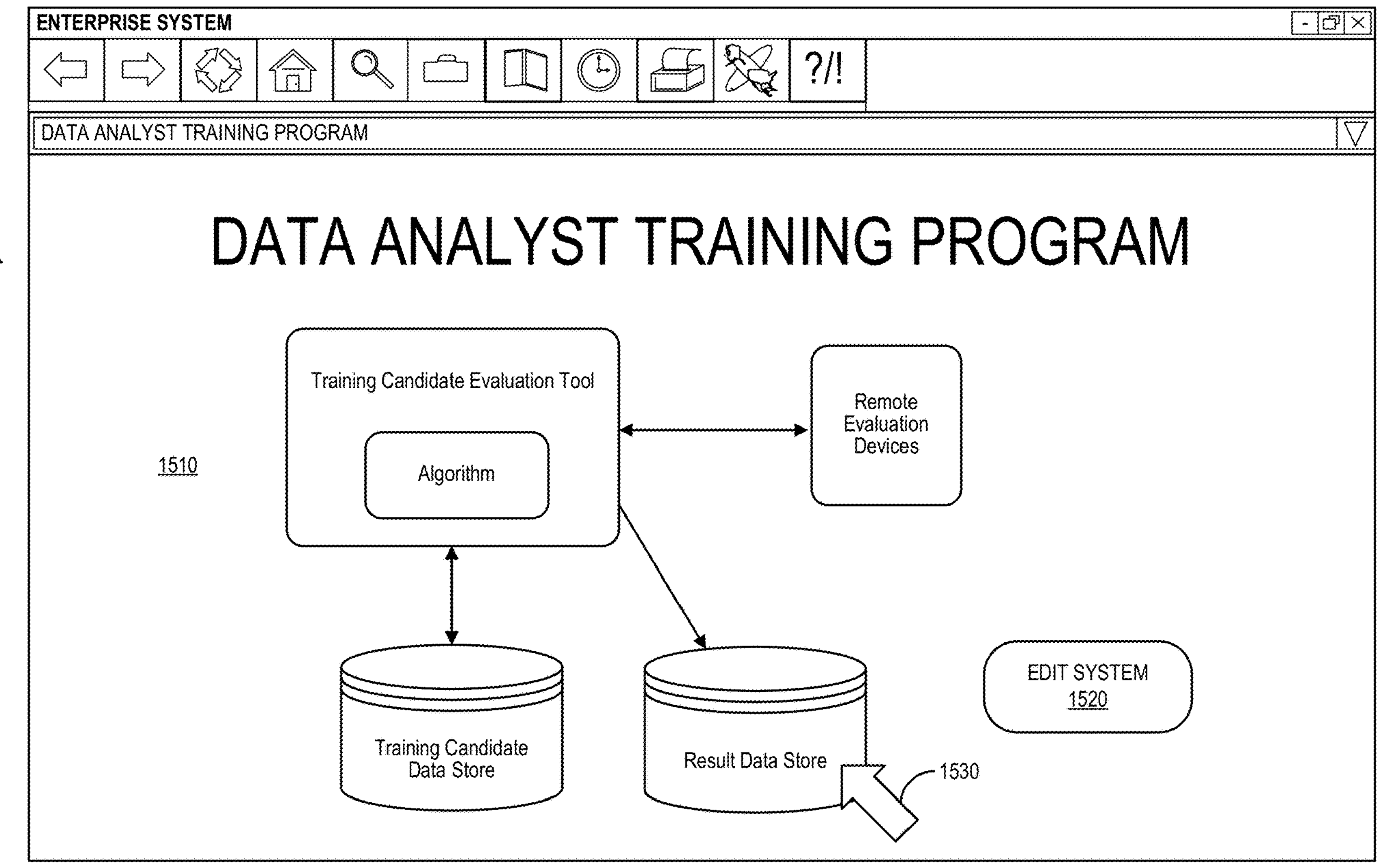
FIG. 15 is an operator or administrator display in according to some embodiments.
Figure 16:
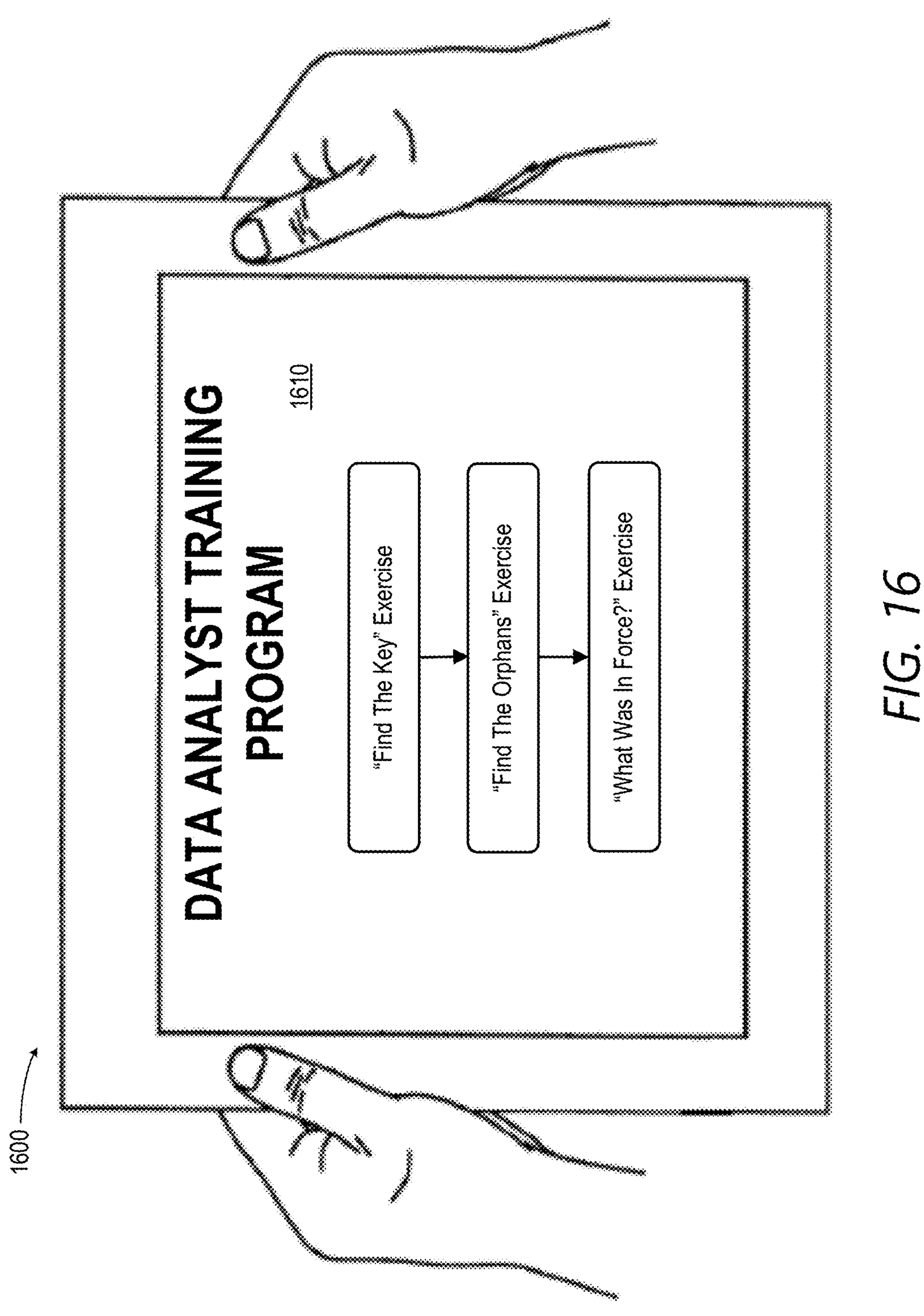
FIG. 16 illustrates a handheld tablet according to some embodiments described herein.

Although specific hardware and data configurations have been described herein, note that any number of other configurations may be provided in accordance with embodiments of the present invention (e.g., some of the information associated with the data stores described herein may be combined or stored in external systems). Note that the displays and devices illustrated herein are only provided as examples, and embodiments may be associated with any other types of interfaces. For example, FIG. 15 is an administrator or operator display 1500 including graphical representations of elements 1510 of a candidate processing system. Selection of a portion or element of the display 1500 might result in the presentation of additional information about that portion or device (e.g., a popup window presenting a more detailed view of data mappings, communication addresses for remote devices or candidates, or other specifics of the system implementation) or let an operator or administrator enter or annotate additional information about the candidate processing system (e.g., based on recommendations from a ML model). Selection of an "Edit System" icon 1520 (e.g., by touchscreen or computer mouse pointer 1530) might cause the system or platform to save changes, transmit an invitation to an accepted candidate, etc. According to some embodiments a warning signal or alert may be automatically transmitted to a communication device (e.g., associated with a manager) when a value moves beyond a threshold (e.g., when a candidate is not performing well during the training program). Similarly, FIG. 16 illustrates a handheld tablet 1600 display 1610 in accordance with some embodiments. The display 1610 includes a graphical representation of a filtering process. The display 1610 might be used, for example, to add, delete, or modify exercises from the filtering process. Although an insurance company is used herein as one example of an enterprise, note that embodiments might be associated with any other types of business (e.g., financial enterprises, educational enterprises, etc.).

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

What is claimed:

1. A system to facilitate a data analyst training program for an enterprise, comprising:

(a) a training candidate data store containing electronic records, each record including a training candidate identifier and a set of candidate parameters;

(b) a training candidate evaluation tool, coupled to the training candidate data store, including:

a computer processor for executing program instructions; and a memory, coupled to the computer processor, storing program instructions that, when executed by the computer processor, cause the training candidate evaluation tool to:

receive, from a remote evaluation device via a distributed communication network, an indication of a selected training candidate, retrieve, from the training candidate data store, information about the selected training candidate, retrieve information from a Machine Learning ("ML") process, an Artificial Intelligence ("AI") algorithm, and predictive models, based on the retrieved information about the selected candidate and the retrieved information from the ML process, the AI algorithm, and the predictive models, automatically calculate, using at least some of the candidate parameters, an enterprise data analyst training score for the selected training candidate, transmit the enterprise data analyst training score to the remote evaluation device, receive, from the remote evaluation device, an indication of acceptance of the enterprise data analyst training score including at least one adjustment to the enterprise data analyst training score, responsive to the received indication of acceptance, store the enterprise data analyst training score in a result data store, automatically assign a training workflow to the selected training candidate in accordance with the enterprise data analyst training score and enterprise logic, and provide evaluation feedback to the ML process so that a scoring engine can be automatically improved;

(c) a communication port coupled to the training candidate evaluation tool to facilitate a transmission of data with the remote evaluation device to provide a graphical interactive user interface display via the distributed communication network, the graphical interactive user interface including an indication of the assigned training workflow; and (d) an email server, a workflow application, and a calendar application that receive information directly from the training the candidate evaluation tool to facilitate candidate evaluation and management.

2. The system of claim 1, wherein the set of candidate parameters include at least one of: (i) resume data, (ii) performance evaluations, (iii) questionnaire responses, and (iv) test scores.

3. The system of claim 1, wherein the training candidate evaluation tool identifies a set of enterprise subjects and types of knowledge associated with a target area and finds enterprise units and staff to populate the training candidate data store.

4. The system of claim 3, wherein the training candidate evaluation tool automatically collects information from leaders of the found enterprise units to determine training needs.

5. The system of claim 1, wherein the training candidate evaluation tool allows staff to be nominated for inclusion in the training candidate data store.

6. The system of claim 1, wherein the training candidate evaluation tool uses hands-on exercises as a means of evaluation and screening staff for inclusion in the training candidate data store.

7. The system of claim 1, wherein the training workflow educates staff about technology and data basics.

8. The system of claim 1, wherein the training candidate evaluation tool automatically collects feedback from a target area to improve the data analyst training program.

9. The system of claim 1, wherein the enterprise comprises an insurer and the assigned training workflow is associated with business data analyst training.

10. A computer-implemented method to facilitate a data analyst training program for an enterprise, comprising:

receiving, by a computer processor of a training candidate evaluation tool from a remote evaluation device via a distributed communication network, an indication of a selected training candidate;

retrieving, from a training candidate data store, information about the selected training candidate, wherein the training candidate data store contains electronic records, each record including a training candidate identifier and a set of candidate parameters;

retrieving information from a Machine Learning ("ML") process, an Artificial Intelligence ("AI") algorithm, and predictive models;

based on the retrieved information about the selected candidate and the retrieved information from the ML process, the AI algorithm, and the predictive models, automatically calculating, using at least some of the candidate parameters, an enterprise data analyst training score for the selected training candidate;

transmitting the enterprise data analyst training score to the remote evaluation device;

receiving, from the remote evaluation device, an indication of acceptance of the enterprise data analyst training score including at least one adjustment to the enterprise data analyst training score;

responsive to the received indication of acceptance, storing the enterprise data analyst training score in a result data store;

automatically assigning a training workflow to the selected training candidate in accordance with the enterprise data analyst training score and enterprise logic, providing evaluation feedback to the ML process so that a scoring engine can be automatically improved, and receiving at an email server, a workflow application, and a calendar application information directly from the training the candidate evaluation tool to facilitate candidate evaluation and management.

11. The method of claim 10, wherein the set of candidate parameters include at least one of: (i) resume data, (ii) performance evaluations, (iii) questionnaire responses, and (iv) test scores.

12. The method of claim 10, wherein the training candidate evaluation tool identifies a set of enterprise subjects and types of knowledge associated with a target area and finds enterprise units and staff to populate the training candidate data store.

13. A non-transitory computer-readable medium storing instructions adapted to be executed by a computer processor to perform a method to facilitate a data analyst training program for an enterprise, the method comprising:

receiving, by a computer processor of a training candidate evaluation tool from a remote evaluation device via a distributed communication network, an indication of a selected training candidate;

retrieving, from a training candidate data store, information about the selected training candidate, wherein the training candidate data store contains electronic records, each record including a training candidate identifier and a set of candidate parameters;

retrieving information from a Machine Learning ("ML") process, an Artificial Intelligence ("AI") algorithm, and predictive models;

based on the retrieved information about the selected candidate and the retrieved information from the ML process, the AI algorithm, and the predictive models, automatically calculating, using at least some of the candidate parameters, an enterprise data analyst training score for the selected training candidate;

transmitting the enterprise data analyst training score to the remote evaluation device;

receiving, from the remote evaluation device, an indication of acceptance of the enterprise data analyst training score including at least one adjustment to the enterprise data analyst training score;

responsive to the received indication of acceptance, storing the enterprise data analyst training score in a result data store;

automatically assigning a training workflow to the selected training candidate in accordance with the enterprise data analyst training score and enterprise logic, providing evaluation feedback to the ML process so that a scoring engine can be automatically improved, and receiving at an email server, a workflow application, and a calendar application information directly from the training the candidate evaluation tool to facilitate candidate evaluation and management.

14. The medium of claim 13, wherein the training candidate evaluation tool allows staff to be nominated for inclusion in the training candidate data store.

15. The medium of claim 13, wherein the training candidate evaluation tool uses hands-on exercises as a means of evaluation and screening staff for inclusion in the training candidate data store.

16. The medium of claim 13, wherein the training workflow educates staff about technology and data basics.

* * * * *